United States Patent
Sasase (10) Patent No.: US 9,304,726 B2
(45) Date of Patent: Apr. 5, 2016

(54) PRINTING SYSTEM AND CONTROL METHOD TO GENERATE A PRINT JOB FROM A MOBILE DEVICE

(71) Applicant: Konica Minolta, Inc., Chiyoda-ku (JP)

(72) Inventor: Naoko Sasase, Itami (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 14/602,388

(22) Filed: Jan. 22, 2015

(65) Prior Publication Data

US 2015/0205552 A1 Jul. 23, 2015

(30) Foreign Application Priority Data

Jan. 23, 2014 (JP) .................. 2014-010437

(51) Int. Cl.
*H04N 1/21* (2006.01)
*G06F 3/12* (2006.01)
*H04N 1/00* (2006.01)

(52) U.S. Cl.
CPC ............ *G06F 3/1255* (2013.01); *G06F 3/1289* (2013.01); *H04N 1/00244* (2013.01); *H04N 1/00281* (2013.01); *H04N 1/21* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2003/0112464 A1* | 6/2003 | Garcia et al. | 358/1.15 |
| 2004/0165209 A1* | 8/2004 | Aoki et al. | 358/1.14 |
| 2006/0192997 A1* | 8/2006 | Matsumoto et al. | 358/1.15 |
| 2007/0156487 A1 | 7/2007 | Sanabria et al. | |
| 2009/0303547 A1* | 12/2009 | Kurihara | 358/3.28 |
| 2010/0265544 A1* | 10/2010 | Anezaki et al. | 358/1.15 |
| 2011/0235085 A1* | 9/2011 | Jazayeri et al. | 358/1.14 |
| 2011/0299111 A1* | 12/2011 | Hasegawa | 358/1.15 |
| 2013/0021643 A1* | 1/2013 | Nuggehalli et al. | 358/1.15 |
| 2015/0092233 A1* | 4/2015 | Park et al. | 358/1.15 |

FOREIGN PATENT DOCUMENTS

| | | |
|---|---|---|
| JP | 2006-185009 A | 7/2006 |
| JP | 2009-522647 A | 6/2009 |

* cited by examiner

*Primary Examiner* — Ming Hon
(74) *Attorney, Agent, or Firm* — Buchanan Ingersoll & Rooney PC (57) ABSTRACT

A terminal apparatus downloads a file from a file server, generates a print job using the downloaded file, and transmits the generated print job toward an MFP. In the terminal apparatus, an application for downloading the file to be printed from the file server (a first application) accepts input of information which specifies the file to be downloaded, and thereafter initiates an application for transmitting the print job toward the MFP (a second application). After the second application accepts input of print setting, the first application starts download of the file.

9 Claims, 11 Drawing Sheets

PRINTING SYSTEM AND CONTROL METHOD TO GENERATE A PRINT JOB FROM A MOBILE DEVICE

This application is based on Japanese Patent Application No. 2014-010437 filed with the Japan Patent Office on Jan. 23, 2014, the entire content of which is hereby incorporated by reference.

BACKGROUND OF THE INVENTION

1. Field of the Invention

The present invention relates to an information terminal, a printing system, a control method for a printing system, and a storage medium. In particular, the present invention relates to an information terminal for outputting a printing instruction to an image formation device, a printing system including the information terminal, a control method for the printing system including the information terminal, and a storage medium.

2. Description of the Related Art

Systems which print printing data generated by using a mobile terminal as an example of an information terminal, through a network, have been known (Japanese Laid-Open Patent Publication No. 2006-185009). For example, it has been disclosed that, in a case where plural pieces of software configure a workflow and processing of a piece of software cannot be performed in the workflow, the processing of the piece of software is temporarily stopped, as described in Japanese National Patent Publication No. 2009-522647. However, a mobile terminal may have limitations in the processing ability of a CPU (Central Processing Unit) and the capacity of a memory. Thus, unlike a personal computer, it may be impossible for a mobile terminal to establish a large-scale print application, that is, to install and use a large-scale print application.

On the other hand, also in MFP (Multi-Functional Peripheral) applications for mobile terminals, for example, multi-functionality such as pull-print capability is required.

When the function of an application is expanded, it is common to redistribute the application having an additional function. In order to suppress bloating of an application, it is useful to configure a print application for a mobile terminal as a combination of a basic function (cooperation source) application and an expanded function (cooperation destination) application, that is, as a combination of a plurality of applications.

Various functions can be added to an MFP application for a mobile terminal by changing a cooperation destination application. However, it may be impossible for a cooperation source application and a cooperation destination application to perform processing simultaneously, due to limitations of a mobile OS (Operation System). In such a case, the cooperation source application performs a portion of processing, then passes required data to the cooperation destination application and is terminated, and thereafter the cooperation destination application is initiated and takes over the processing.

In the MFP application for a mobile terminal, when a file to be processed is downloaded from an external server, an application which is performing the download cannot be terminated until the download of the file is completed, due to limitations of the OS in the mobile terminal. This is because, if the application is terminated, the download itself is interrupted.

Accordingly, when download of a file is instructed to the cooperation source application, a user cannot move on to an operation for next processing (such as transmission of the file to be downloaded to an MFP) until the download is completed. Thus, the mobile terminal has had a problem in terms of operability.

More specifically, there have been cases where, even when a file to be printed has been determined and the contents of the file do not have to be confirmed, the user cannot perform a next operation (such as selection of a printer, printing setting, and the like) on the cooperation destination application until the download is completed, that is, until the mobile terminal acquires the file, and the user has to wait for a longer time.

SUMMARY OF THE INVENTION

The present disclosure has been made in view of such circumstances, and one object of the present disclosure is to further shorten a user's waiting time for downloading a file.

According to an aspect of the present disclosure, provided is an information terminal including an execution unit for executing a first application for downloading a file and a second application for transmitting a print job including the file downloaded by the first application toward an image formation device, wherein the second application is executed by being invoked by the first application, and is in a suspended state when the first application is executed, and the first application is in a suspended state when the second application is executed, the information terminal further including a memory for storing data used for the first application and data used for the second application, wherein the first application accepts input of first data which is information specifying the file to be downloaded, stores the first data in the memory, invokes the second application, and shifts to the suspended state before starting download processing of the file specified by the first data and after invoking the second application, when the second application is invoked by the first application, the second application accepts input of second data which is information for print setting for the file specified by the first data, stores the second data in the memory, invokes the first application, and thereafter shifts to the suspended state, and, when the first application is invoked by the second application, the first application starts download of the file specified by the first data.

Preferably, when download of the first data is completed, the first application invokes the second application, and, when the second application is invoked by the first application after the download of the first data is completed, the second application generates a print job for the file specified by the first data using the second data, and transmits the print job to the image formation device.

Preferably, at least one of processing for indicating that the first application is performing the download of the file specified by the first data and processing for indicating that the second application is transmitting the print job for the file specified by the first data to the image formation device is performed.

Preferably, when the download of the first data has an error, the first application is terminated without invoking the second application.

Preferably, information specifying the second application is stored in the memory, wherein the first application invokes an application specified by the information stored in the memory, as the second application.

According to another aspect of the present disclosure, provided is a printing system including a printer and an information terminal for transmitting a print job toward the printer, the information terminal including an execution unit for executing a first application for downloading a file and a second application for transmitting the print job including the file downloaded by the first application toward an image formation device, wherein the second application is executed by being invoked by the first application, and is in a suspended state when the first application is executed, and the first application is in a suspended state when the second application is executed, the information terminal further including a memory for storing data used for the first application and data used for the second application, wherein the first application accepts input of first data which is information specifying the file to be downloaded, stores the first data in the memory, invokes the second application, and shifts to the suspended state before starting download processing of the file specified by the first data and after invoking the second application, when the second application is invoked by the first application, the second application accepts input of second data which is information for print setting for the file specified by the first data, stores the second data in the memory, invokes the first application, and thereafter shifts to the suspended state, and, when the first application is invoked by the second application, the first application starts download of the file specified by the first data.

According to still another aspect of the present disclosure, provided is a control method for a printing system including a printer and an information terminal for transmitting a print job toward the printer, executed by a computer of the information terminal, the computer including a memory, the control method including the steps of executing a first application for downloading a file, and executing a second application for transmitting the print job including the file downloaded by the first application toward an image formation device, wherein the second application is executed by being invoked by the first application, and is in a suspended state when the first application is executed, the first application is in a suspended state when the second application is executed, the first application accepts input of first data which is information specifying the file to be downloaded, stores the first data in the memory, invokes the second application, and shifts to the suspended state before starting download processing of the file specified by the first data and after invoking the second application, when the second application is invoked by the first application, the second application accepts input of second data which is information for print setting for the file specified by the first data, stores the second data in the memory, invokes the first application, and thereafter shifts to the suspended state, and, when the first application is invoked by the second application, the first application starts download of the file specified by the first data.

According to still another aspect of the present disclosure, provided is a non-transitory computer-readable storage medium recording a program to be executed, in a printing system including a printer and an information terminal for transmitting a print job toward the printer, by a computer of the information terminal, wherein the computer includes a memory, the program causes the computer to execute a first application for downloading a file, the first application invokes a second application which is an application for transmitting the print job including the downloaded file toward an image formation device and which is in a suspended state when the first application is executed, the first application is in a suspended state when the second application is executed, and the first application accepts input of first data which is information specifying the file to be downloaded, stores the first data in the memory, invokes the second application, and shifts to the suspended state before starting download processing of the file specified by the first data and after invoking the second application, the suspended state continues at least until the second application accepts input of second data which is information for print setting for the file specified by the first data, stores the second data in the memory, and invokes the first application, and, when the first application is invoked by the second application, the first application starts download of the file specified by the first data.

According to still another aspect of the present disclosure, provided is a non-transitory computer-readable storage medium recording a program to be executed, in a printing system including a printer and an information terminal for transmitting a print job toward the printer, by a computer of the information terminal, wherein the computer includes a memory, the program causes the computer to execute a second application for transmitting the print job including a file downloaded by a first application for downloading the file toward an image formation device, the second application is in a suspended state when the first application is executed, the first application being in a suspended state when the second application is executed, the second application is initiated by being invoked by the first application before start of download of the file specified by first data which is information specifying the file to be downloaded and is stored in the memory, and the second application accepts input of second data which is information for print setting for the file specified by the first data, stores the second data in the memory, invokes the first application to start the download of the file specified by the first data, and thereafter shifts to the suspended state.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, a printing system in accordance with the present invention will be described with reference to the drawings. It is noted that components having the same actions and functions will be designated by the same reference numerals in the drawings, and the description thereof will not be repeated.

[Outline of Configuration of Printing System]

Figure 1:
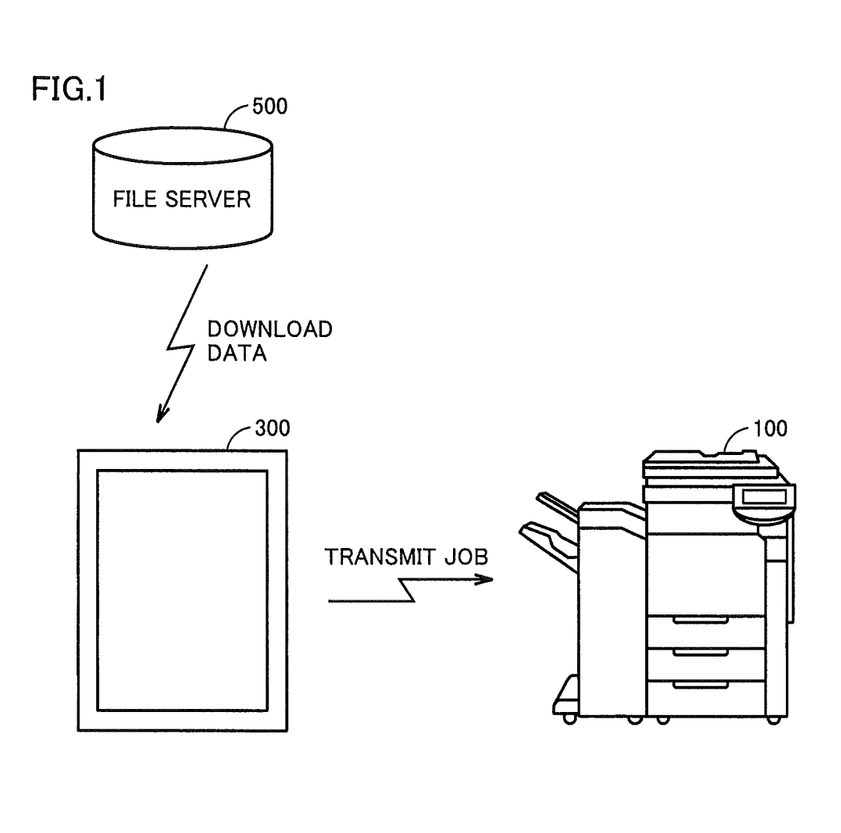
FIG. 1 is a view for illustrating an outline of an example of a configuration of a printing system of the present embodiment.

FIG. 1 is a view for illustrating an outline of an example of a configuration of a printing system of the present embodiment.

As shown in FIG. 1, the printing system in accordance with the present embodiment includes an MFP 100 as an example of a printer, a terminal apparatus 300 as an example of an information terminal, and a file server 500. MFP 100 is communicably connected with terminal apparatus 300 in a wired or wireless manner. Terminal apparatus 300 is communicably connected with file server 500 in a wired or wireless manner.

In the printing system of the present embodiment, terminal apparatus 300 downloads a file from file server 500, generates a print job by using the downloaded file, and transmits the generated print job toward MFP 100. In the present embodiment, the transmission toward MFP 100 is implemented through a print server (not shown). That is, terminal apparatus 300 transmits the print job to the print server, and the print server transmits the print job to MFP 100. It is noted that terminal apparatus 300 may directly transmit the print job to MFP 100.

In terminal apparatus 300, an application for downloading the file to be printed from file server 500 (a first application), and an application for transmitting the print job toward MFP 100 (a second application) are installed.

It is noted that, in the printing system of the present embodiment, the first application accepts input of information which specifies the file to be downloaded, and thereafter initiates the second application. Then, the first application waits for the second application to accept input of print setting, and thereafter starts download of the file specified by the above information. That is, after the first application accepts the input of the above information, the first application suspends download processing until the input of the print setting to the second application is completed.

[Hardware Configurations]

Figure 2:
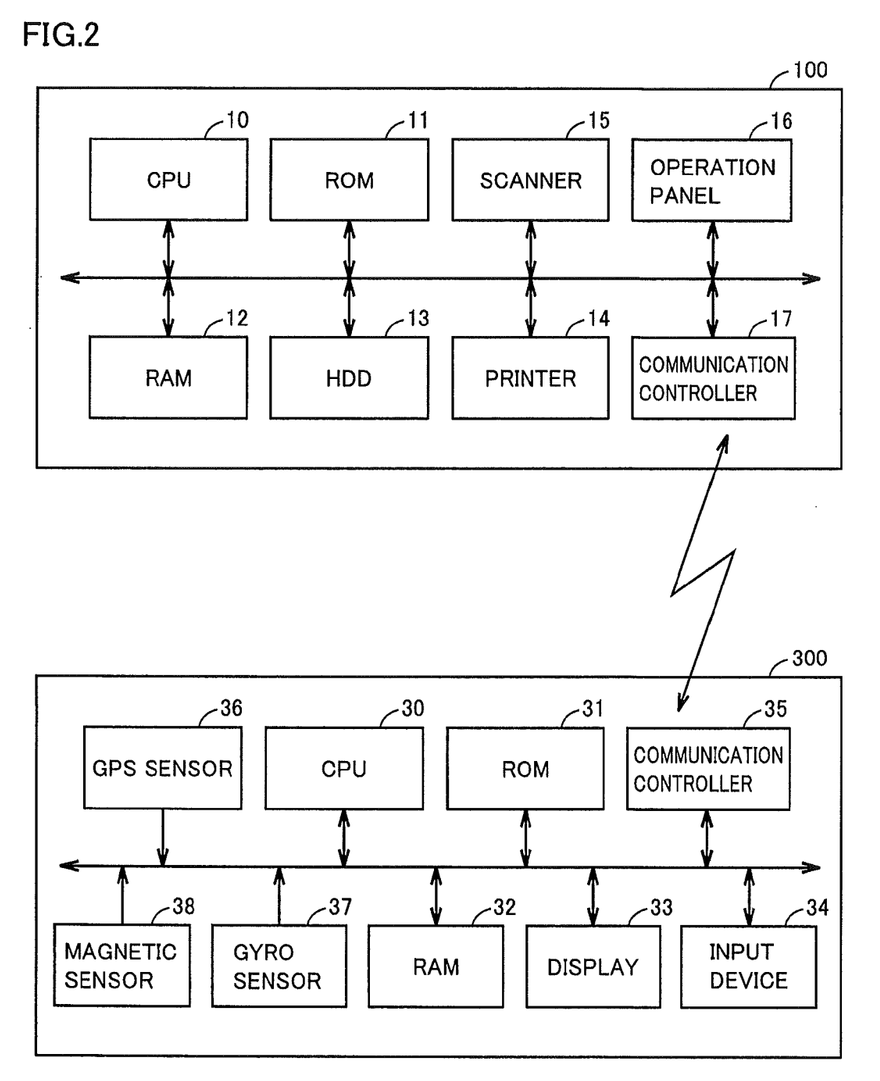
FIG. 2 is a view showing an example of hardware configurations of an MFP and a terminal apparatus.

FIG. 2 is a view showing an example of hardware configurations of MFP 100 and terminal apparatus 300.

As shown in FIG. 2, MFP 100 includes a CPU (Central Processing Unit) 10 for controlling the entire device, a ROM (Read Only Memory) 11 as a memory for storing programs and the like executed by CPU 10, a RAM 12 as a memory serving as a working area when CPU 10 executes a program and the like, an HDD (Hard Disk Drive) 13 as a memory for storing image data and the like, a printer 14, a scanner 15, an operation panel 16, and a communication controller 17 for controlling communication with terminal apparatus 300.

Terminal apparatus 300 includes a CPU 30 for controlling the entire apparatus, a ROM 31 as a memory for storing programs and the like executed by CPU 30, a RAM 32 as a memory storing various types of data and serving as a working area when CPU 30 executes a program, a display 33, an input device 34 such as a button, a communication controller 35 for controlling communication with MFP 100, a GPS sensor 36 for acquiring positional information, a gyro sensor 37 for detecting a rotation angle of terminal apparatus 300 and the like, and a magnetic sensor 38 for detecting strength of a magnetic field for detection of approach of an object and the like.

[Functional Configuration]

Figure 3:
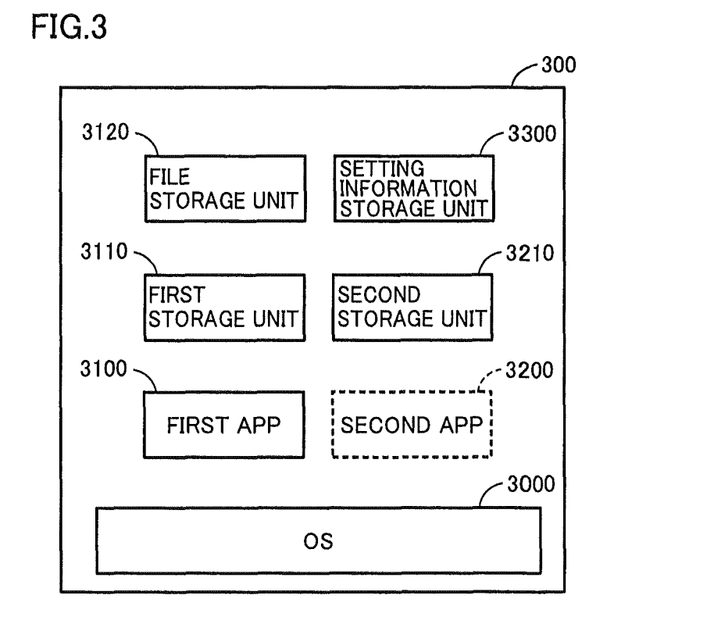
FIG. 3 is a view showing an example of a functional configuration of the terminal apparatus.

FIG. 3 is a view showing an example of a functional configuration of terminal apparatus 300.

As shown in FIG. 3, in terminal apparatus 300, an OS (Operating System) 3000 as a basic program, a first application 3100, and a second application 3200 are installed. These programs are stored in ROM 31, for example. In terminal apparatus 300, CPU 30 executes OS 3000, first application 3100, and second application 3200. In the drawings such as FIG. 3, the "application" is abbreviated as an "APP" as appropriate.

It is noted that at least one of OS 3000, first application 3100, and second application 3200 may be installed by being downloaded to terminal apparatus 300 through a network, or by reading a program from a removable storage medium into terminal apparatus 300, after shipment of terminal apparatus 300.

Terminal apparatus 300 further includes a first storage unit 3110 for storing information which specifies a file to be downloaded by first application 3100 (hereinafter referred to as "file-specifying information"), a file storage unit 3120 for storing the file downloaded by first application 3100, and a second storage unit 3210 for storing information based on which second application 3200 generates a print job (hereinafter referred to as "job-setting information"). First storage unit 3110, file storage unit 3120, and second storage unit 3210 are formed by RAM 32, for example.

Terminal apparatus 300 also includes a setting information storage unit 3300 for storing information for specifying second application 3200 (hereinafter referred to as "application-specifying information"). Setting information storage unit 3300 is formed by RAM 32, for example.

[Flow of Processing]

Figure 4:
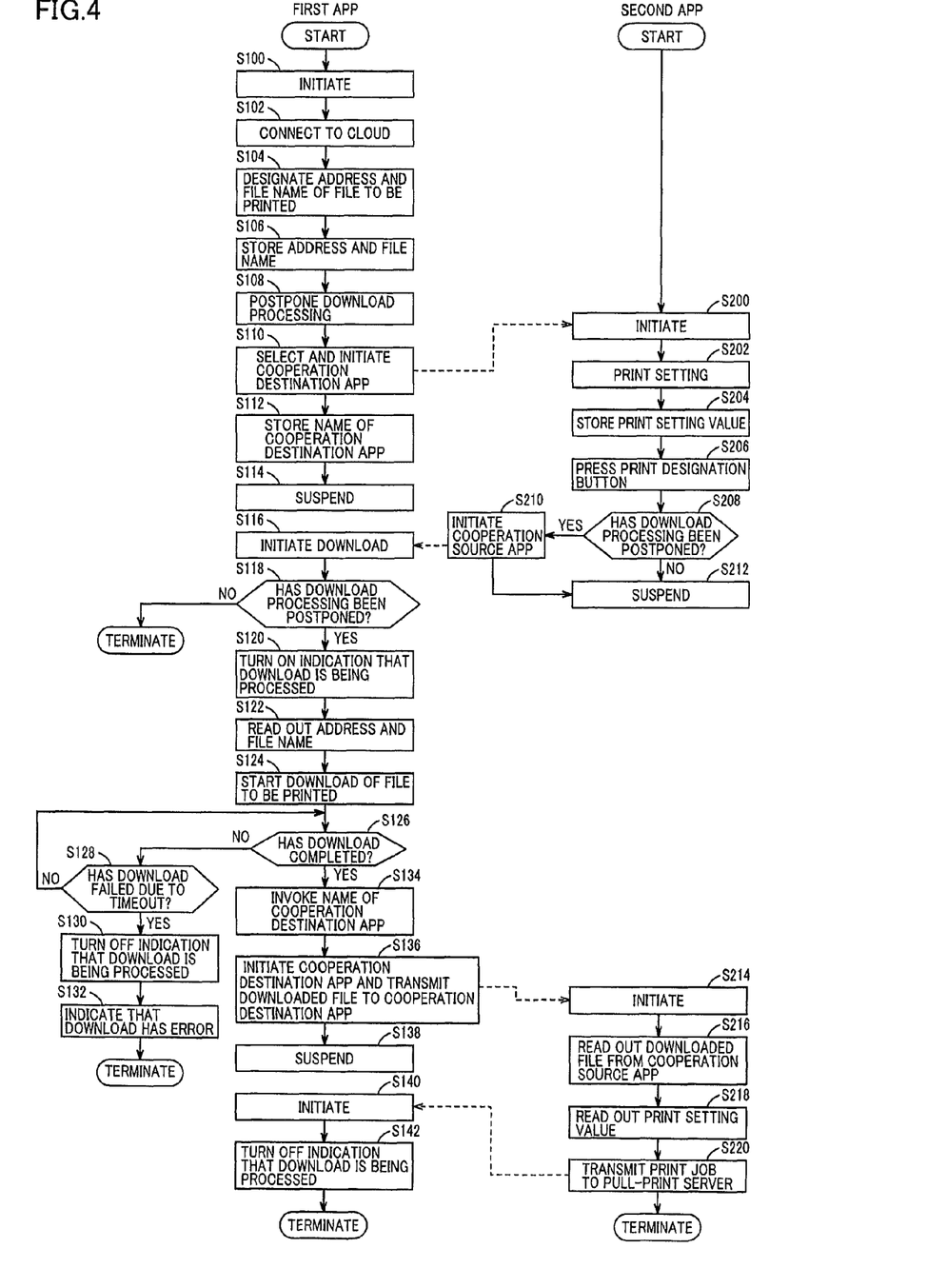
FIG. 4 is a flowchart of processing performed by a first application and a second application in the terminal apparatus.

FIG. 4 is a flowchart of processing performed by the first application and the second application in terminal apparatus 300. Processing of the first application is shown on the left side of FIG. 4. Processing of the second application is shown on the right side of FIG. 4. Referring to FIG. 4, a flow of processing for downloading a file and generating a print job in terminal apparatus 300 will be described.

In terminal apparatus 300, first, the first application is initiated in step S100. The first application is initiated for example by inputting an instruction to initiate the first application, to input device 34. Thereby, CPU 30 executes the first application.

In the present specification, to clarify the relation between the executed application and the realized control, the control executed by CPU 30 executing an application may be described as the control executed by the application.

Next, in step S102, the first application connects to a cloud server (an example of a server on a network).

Next, in step S104, the first application accepts designation of the address and the file name of a file to be printed. In the present embodiment, information which designates the address of the file to be printed and information which designates the file name of the file to be printed are examples of the file-specifying information described above.

Figure 5:
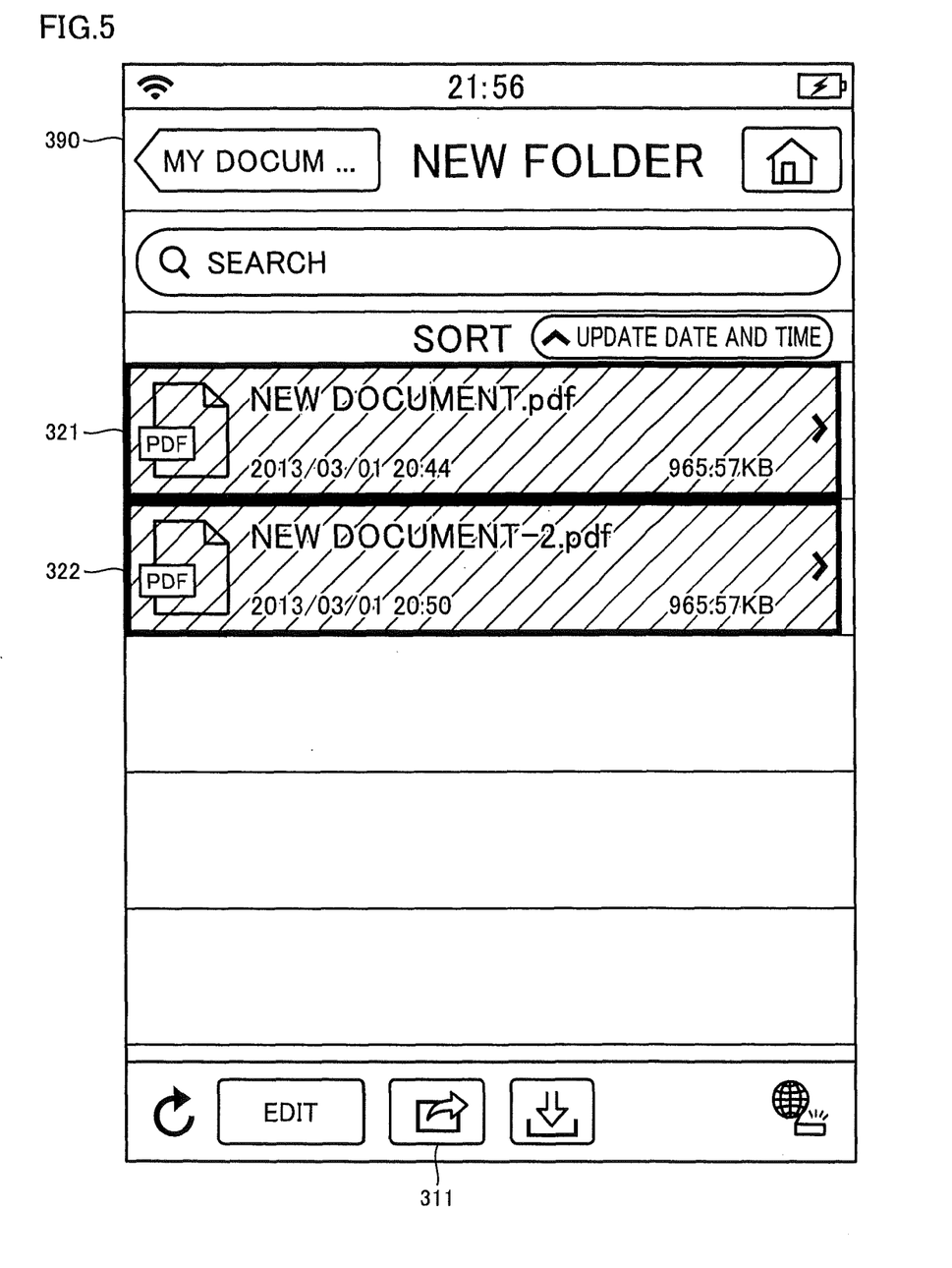
FIGS. 5 and 6 are views showing examples of screens displayed on a display.
Figure 6:
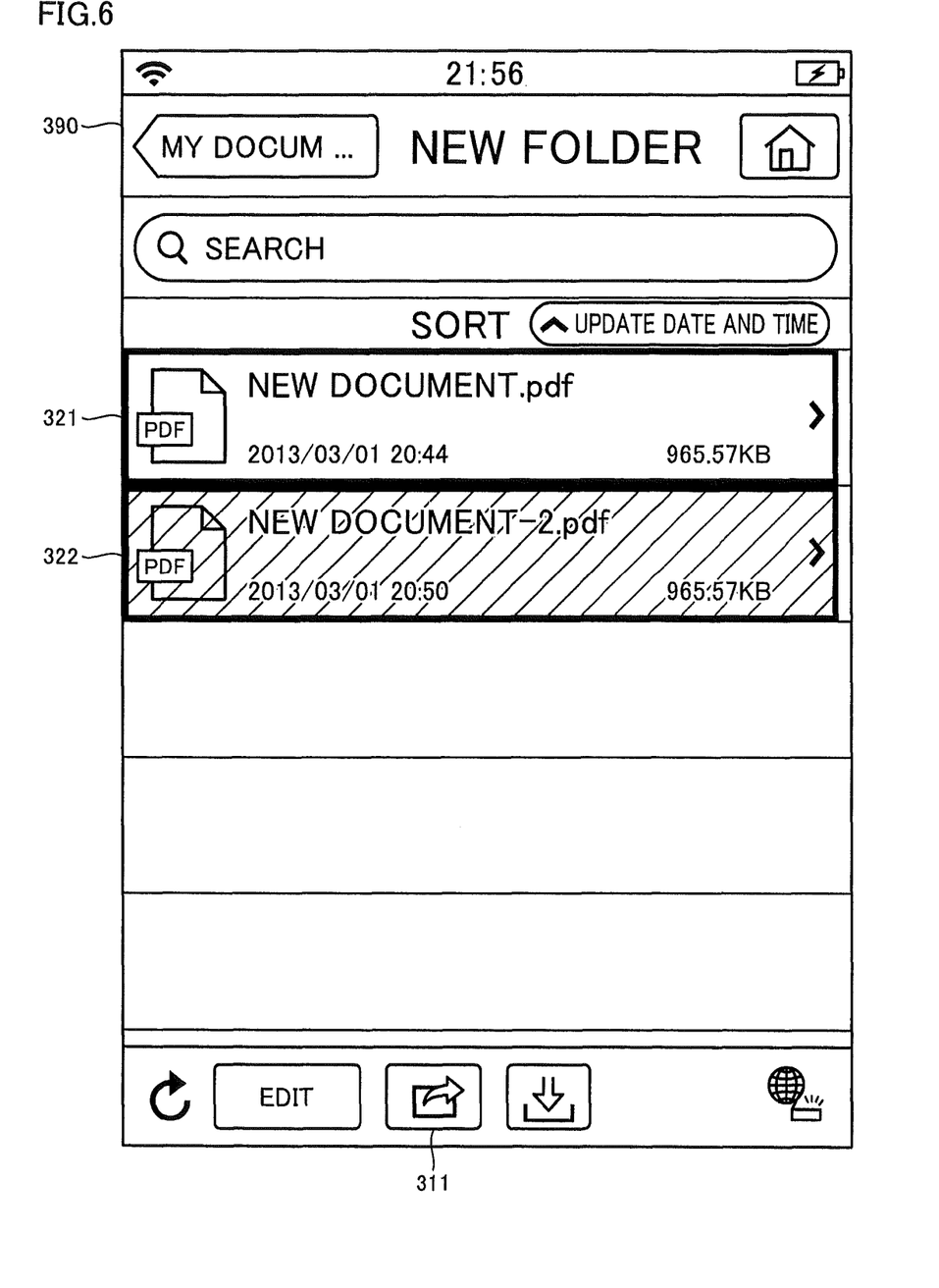

The first application receives the information which designates the address of the file to be printed and the information which designates the file name of the file to be printed, for example through input device 34. A more specific description will be given with reference to FIGS. 5 and 6. FIGS. 5 and 6 are views showing examples of screens displayed on display 33.

A default storage area in the cloud server is set in the first application. A screen 390 of FIG. 5 shows a list of files stored in the default storage area. More specifically, screen 390 of FIG. 5 includes icons 321, 322 indicating two files, respectively, stored in the storage area. In FIG. 5, icons 321, 322 are displayed in grayout. Further, screen 390 includes a button 311 for determining designation of a file to be printed.

A user inputs, to input device 34, information which designates at least one of the files displayed on screen 390.

Thereby, as shown in FIG. 6, the icon corresponding to the designated file (icon 321) is displayed brightly (i.e., grayout is canceled) on screen 390.

Then, when the user further inputs information which designates button 311 to input device 34, the first application receives information which designates the address and the file name of the file corresponding to icon 321.

Returning to FIG. 4, in step S106, the first application stores the information which designates the address and the file name of the file to be printed (file-specifying information) whose input has been accepted in step S104, in first storage unit 3110 (see FIG. 3).

Next, in step S108, (when the file set to be printed is not a file stored in terminal apparatus 300, but a file stored outside terminal apparatus 300, such as a file stored in the cloud server,) the first application sets information which postpones download processing of the file specified by the file-specifying information.

Next, in step S110, the first application selects and initiates a cooperation destination application. The cooperation destination application is selected, for example, based on information stored in setting information storage unit 3300. It is noted that, in step S110, the first application may accept input of information for selecting the cooperation destination application, through input device 34. Further, at the initiation, the first application transmits information indicating that the download processing of the file has been postponed, to the second application. In the present specification, "initiating" the second application by the first application is also referred to as "invoking".

After initiating the second application in step S110, the first application causes setting information storage unit 3300 and the like to store the name of the cooperation destination application in step S112, and thereafter enters a suspended state in step S114. That is, as the cooperation destination application (the second application) is initiated in step S110, the application to be executed by CPU 30 is switched from the first application to the second application, and the first application (a cooperation source application) is suspended.

Figure 7:
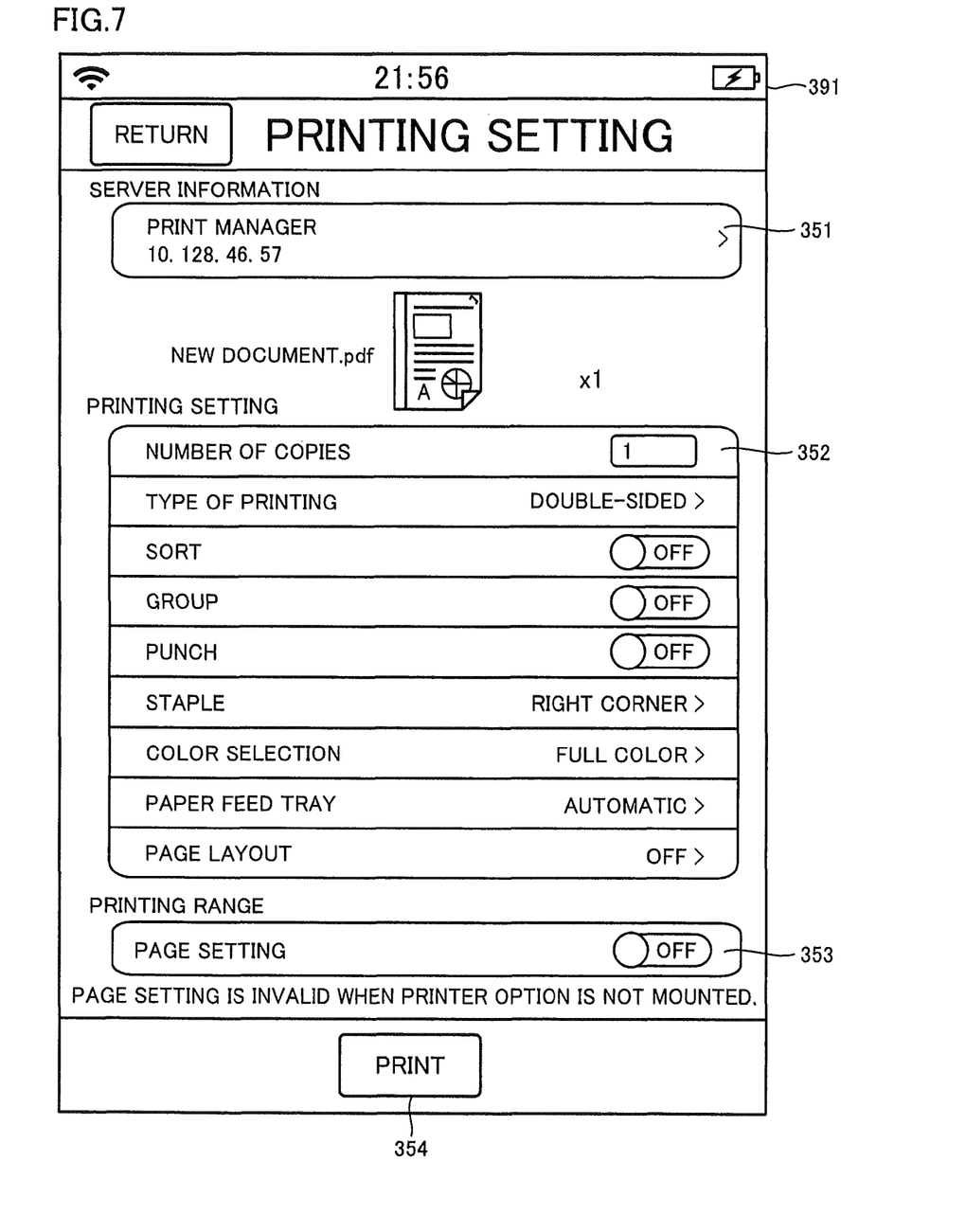
FIG. 7 is an example of a screen displayed on the display to accept input of print setting.

After being initiated in step S200, the second application accepts input of print setting in step S202. FIG. 7 is an example of a screen displayed on display 33 to accept input of print setting.

A screen 391 shown in FIG. 7 includes a window 351 for setting a print server which is a transmission destination of a print job, a window 352 for setting various printing conditions such as the number of copies to be printed, a window 353 for setting a printing range in a file, and a printing button 354 operated when the input of print setting is completed. The user can input setting details and the like to screen 391, by operating input device 34. In window 351, characters "PRINT MANAGER", which are information specifying one print server, are indicated.

Figure 8:
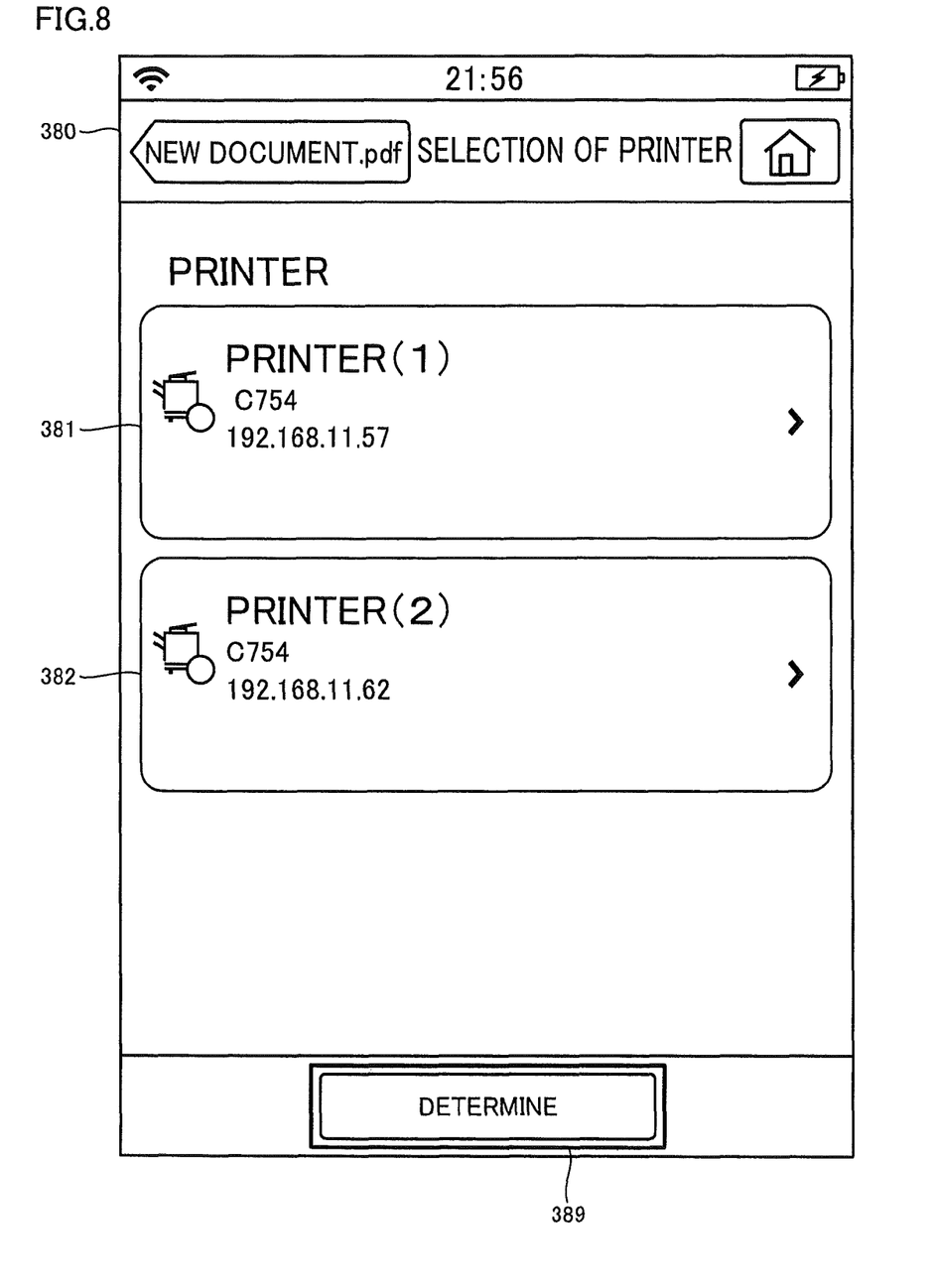
FIG. 8 is a view showing an example of a screen for setting a printer.

It is noted that, when the second application is designed to allow the user to select a printer from printers associated with the set print server, the screen displayed on the display may shift to a screen for setting a printer. FIG. 8 is a view showing an example of the screen for setting a printer. A screen 380 of FIG. 8 is displayed on display 33, for example, by an operation on window 351 of screen 391 of FIG. 7, or the like.

Screen 380 of FIG. 8 includes icons 381, 382 each indicating information for specifying each of the printers associated with the print server set in window 351, and a button 389 for determining selection of a printer in screen 380. Icon 381 indicates characters "PRINTER (1)" for specifying one printer. Icon 382 indicates characters "PRINTER (2)" for specifying another printer. The user can set a printer by operating either one of icons 381, 382 and thereafter operating button 389. When button 389 is operated, the display on display 33 returns to screen 391 of FIG. 7.

Returning to FIG. 4, after accepting the input of print setting in step S202, the second application causes second storage unit 3210 (see FIG. 3) to store details of the input print setting in step S204.

Next, in step S206, the second application waits until an operation is performed on printing button 354 (see FIG. 7), and when the second application determines that the operation has been performed, it advances the control to step S208.

In step S208, the second application determines whether or not the download processing has been postponed in the first application. The determination is made, for example, based on whether or not the second application has received, from the first application, the information that the download processing of the file has been postponed, at the initiation in step S110. Then, when the second application determines that the download processing has been postponed (YES in step S208), it advances the control to step S210, and when the second application determines that the download processing has not been postponed (NO in step S208), it advances the control to step S212.

In step S210, the second application initiates the cooperation source application (the first application). Thereby, the application to be executed by CPU 30 is switched from the second application to the first application. Thereafter, the second application enters a suspended state in step S212. In the present specification, "initiating" the first application by the second application is also referred to as "invoking".

In step S116, the first application initiates a unit of the download of the file in the first application.

Next, in step S118, the first application determines whether or not the download of the file has been postponed in step S110. Then, when the first application determines that the download of the file has been postponed (YES in step S118), it advances the control to step S120, and when the first application determines that the download of the file has not been postponed (NO in step S118), it terminates the control shown in FIG. 4.

Figure 9:
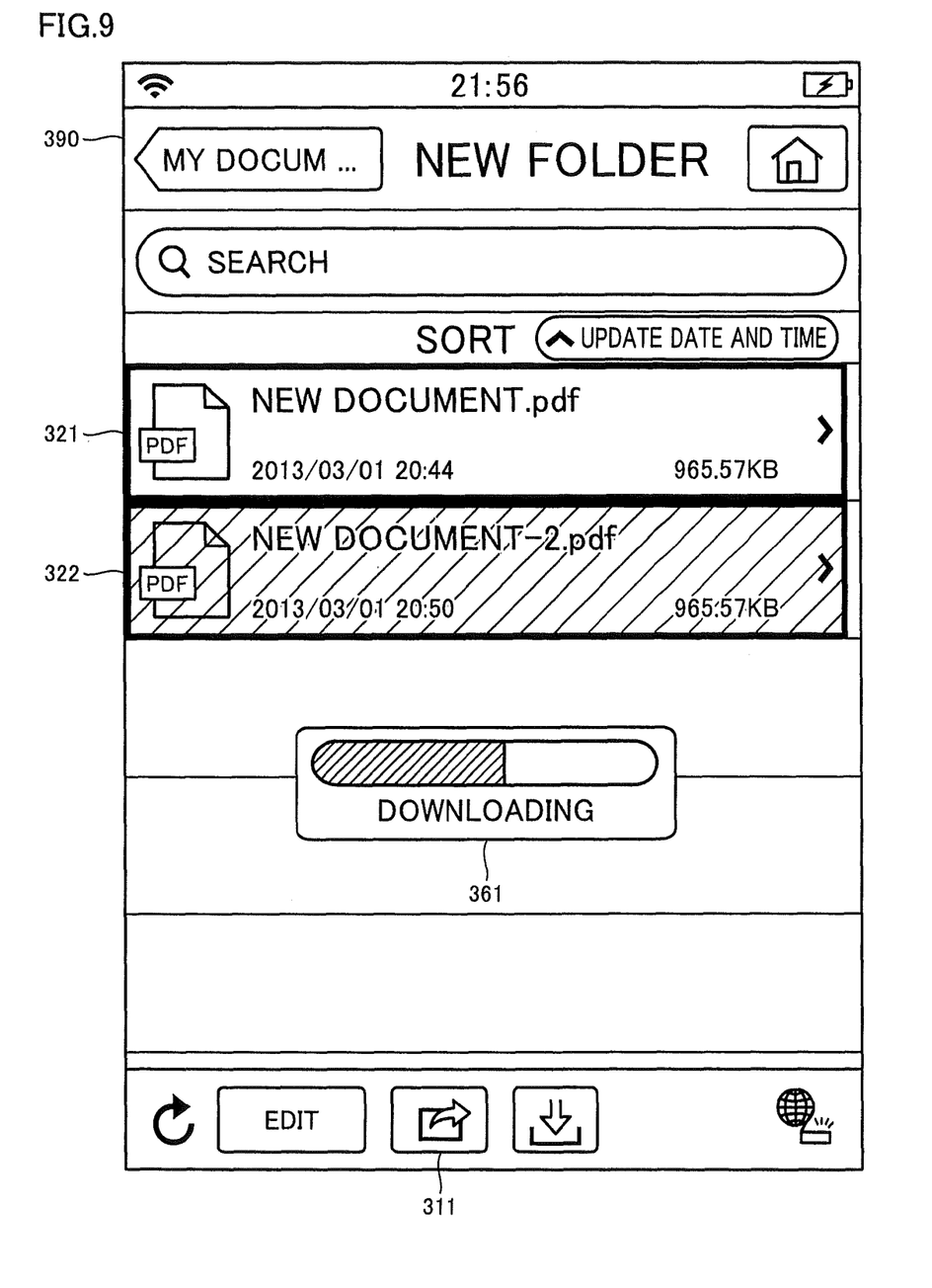
FIG. 9 is a view showing an example of an indication indicating that download is being processed.

In step S120, the first application indicates, on display 33, that the download is being processed. FIG. 9 is a view showing an example of an indication indicating that the download is being processed. In a screen 390 of FIG. 9, a window 361 indicating that the download is being processed is added to screen 390 of FIG. 6.

Returning to FIG. 4, after the indication that the download is being processed is started in step S120, the first application reads out, in step S122, the file whose information has been stored in step S106.

Then, in step S124, the first application starts the download of the file whose information has been read out in step S122.

Next, in step S126, the first application determines whether or not the download of the file started in step S124 has been completed. Then, when the first application determines that the download has not been completed (NO in step S126), it advances the control to step S128, and when the first application determines that the download has been completed (YES in step S126), it advances the control to step S134.

In step S128, the first application determines whether or not the download of the file has failed due to timeout or the like. Then, when the first application determines that the download has not failed (NO in step S128), it returns the control to step S126, and when the first application determines that the download has failed (YES in step S128), it advances the control to step S130.

In step S130, the first application terminates the indication that the download is being processed indicated in step S120, and advances the control to step S132.

In step S132, the first application causes display 33 to indicate that the download has an error, and terminates the processing of FIG. 4. Thereby, the processing of FIG. 4 is terminated without initiating the second application again.

In step S134, the first application invokes (for example, the name of) the cooperation destination application stored in step S112.

Figure 10:
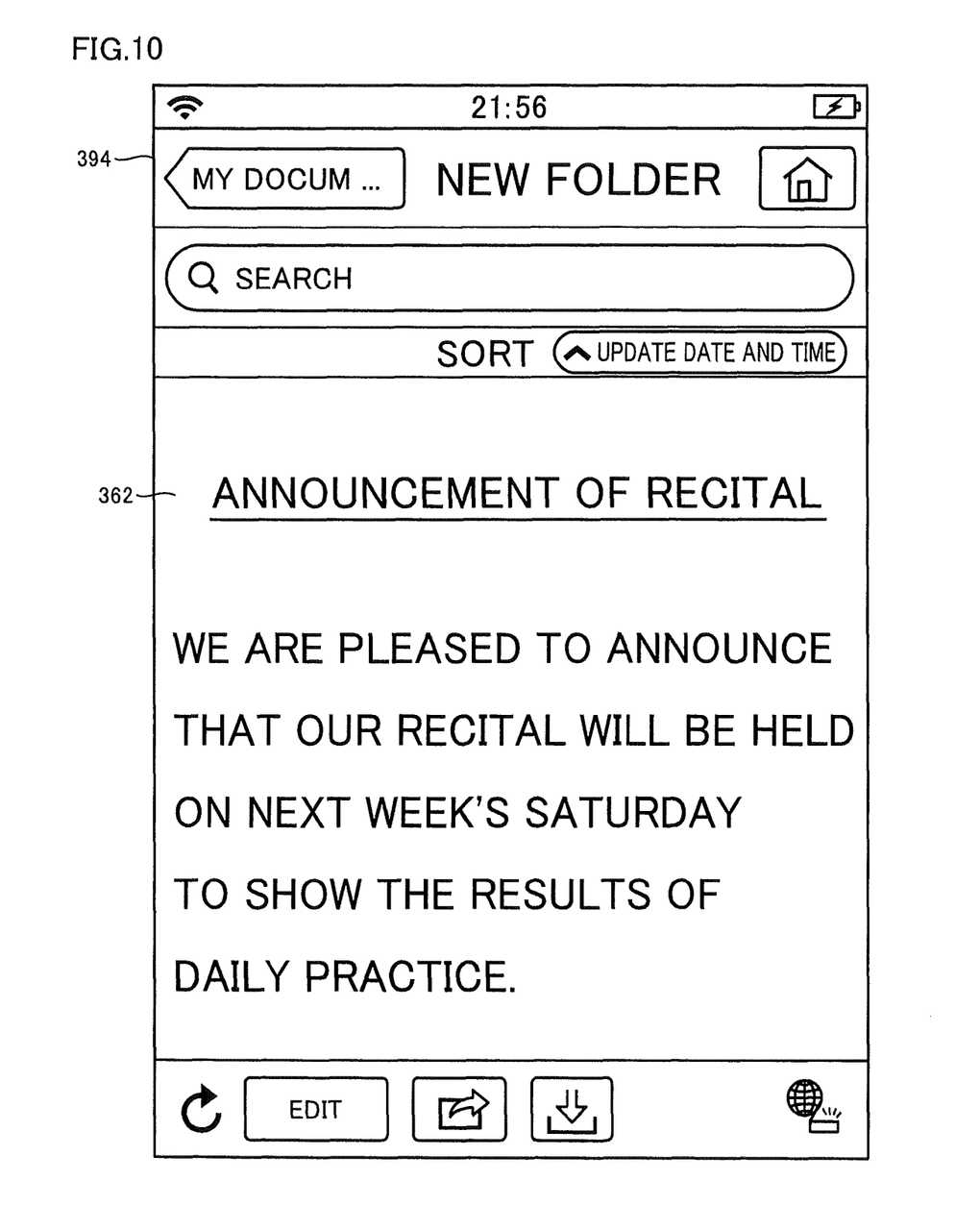
FIG. 10 is a view showing an example of a screen including a preview of a downloaded file.

It is noted that, in step S134, the first application switches the display on display 33 to a preview of the downloaded file. FIG. 10 is a view showing an example of a screen including a preview of the downloaded file. A screen 394 shown in FIG. 10 includes a preview 362 of the downloaded file.

Next, in step S136, the first application initiates the cooperation destination application (the second application), and transmits the downloaded file to the cooperation destination application. As the cooperation destination application (the second application) is initiated, the application to be executed by CPU 30 is switched from the first application to the second application. Thereby, the first application enters a suspended state in step S138.

The second application is initiated in step S214, based on an instruction for initiation from the first application in step S136.

Next, in step S216, the second application reads out the file transmitted from the cooperation source application (the first application).

Next, in step S218, the second application reads out the details of the print setting stored in second storage unit 3210 in step S204.

Next, in step S220, the second application generates a print job for the file read out in step S216 based on the details of the print setting read out in step S218, transmits the print job to the print server, and terminates the processing. It is noted that the second application initiates the first application simultaneously with the transmission of the print job. Thereby, the application to be executed by CPU 30 is switched from the second application to the first application.

Figure 11:
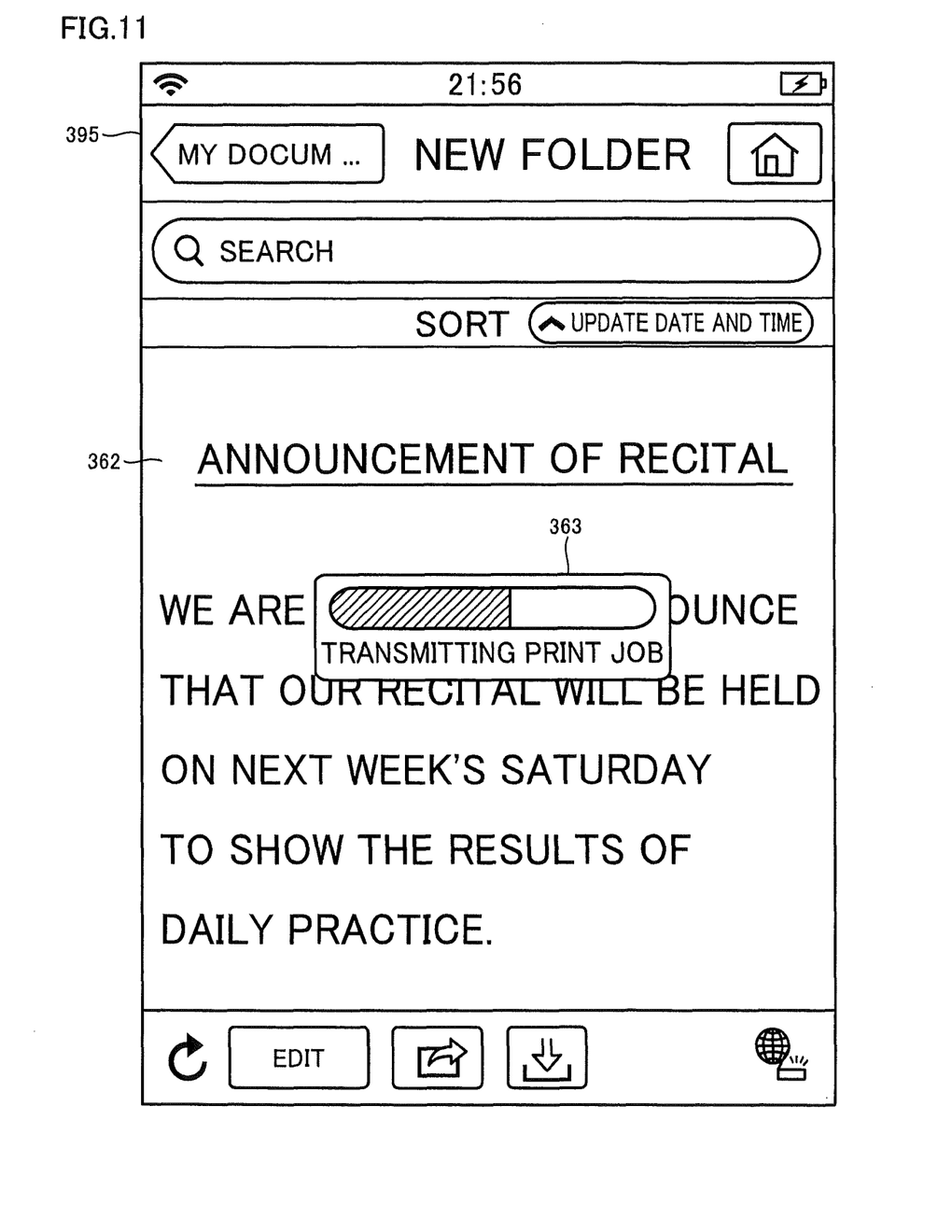
FIG. 11 is a view showing an example of a screen which displays information indicating that a print job for the file is being transmitted.

Based on an instruction in step S220, the first application is initiated in step S140. At the initiation, the first application may cause display 33 to display information indicating that the print job for the file is being transmitted. FIG. 11 is a view showing an example of a screen which displays information indicating that the print job for the file is being transmitted.

A screen 395 shown in FIG. 11 includes, in addition to preview 362 shown in FIG. 10, a window 363 indicating that the print job is being transmitted.

Returning to FIG. 4, after being initiated in step S140, the first application waits until the transmission of the print job is completed. Then, when the transmission of the print job is completed, the first application terminates, in step S142, the indication indicating that the print job is being transmitted (window 363), and terminates the processing shown in FIG. 4. Thereby, the display on display 33 returns to screen 394 shown in FIG. 10.

According to the present disclosure, download of a file by the first application is performed after the second application accepts print setting for the file. Therefore, when a file to be printed has been determined and the contents of the file do not have to be confirmed, the user can perform a next operation (such as selection of a printer, printing setting, and the like) on the cooperation destination application (the second application) without waiting for completion of the download of the file.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information terminal, comprising:
an execution unit for executing a first application for downloading a file and a second application for transmitting a print job including the file downloaded by said first application toward an image formation device, the first application and the second application are separate applications which individually operate, wherein
said second application is executed by being invoked by said first application, and is in a suspended state when said first application is executed, and
said first application is in a suspended state when said second application is executed,
said information terminal further comprising:
a memory for storing data used for said first application and data used for said second application, wherein
said first application accepts input of first data which is information specifying the file to be downloaded, stores the first data in memory, invokes said second application, and shifts to the suspended state before starting download processing of the file specified by said first data and after invoking said second application,
when said second application is invoked by said first application, said second application accepts input of second data which is information for print setting for the file specified by said first data, stores the second data in said memory, invokes said first application, and thereafter shifts to the suspended state, and
when said first application is invoked by said second application, said first application starts download of the file specified by said first data.

2. The information terminal according to claim 1, wherein, when download of said first data is completed, said first application invokes said second application, and
when said second application is invoked by said first application after the download of said first data is completed, said second application generates a print job for the file specified by said first data using said second data, and transmits the print job to the image formation device.

3. The information terminal according to claim 2, wherein at least one of processing for indicating that said first application is performing the download of the file specified by said first data and processing for indicating that said second application is transmitting the print job for the file specified by said first data to said image formation device is performed.

4. The information terminal according to claim 2, wherein, when the download of said first data has an error, said first application is terminated without invoking said second application.

5. The information terminal according to claim 1, wherein information specifying the second application in said memory, and
the first application invokes an application specified by the information stored in said memory, as said second application.

6. A printing system, comprising:
a printer; and
an information terminal for transmitting a print job toward the printer,
said information terminal including an execution unit for executing a first application for downloading a file and a second application for transmitting the print job including the file downloaded by said first application toward an image formation device, the first application and the second application are separate applications which individually operate, wherein said second application is executed by being invoked by said first application, and is in a suspended state when said first application is executed, and said first application is in a suspended state when said second application is executed, said information terminal further including:

a memory for storing data used for said first application, and data used for said second application, wherein said first application accepts input of first data which is information specifying the file to be downloaded, stores the first data in said memory, invokes said second application, and shifts to the suspended state before starting download processing of the file specified by said first data and after invoking said second application, when said second application is invoked by said first application, said second application accepts input of second data which is information for print setting for the file specified by said first data, stores the second data in said memory, invokes said first application, and thereafter shifts to the suspended state, and when said first application is invoked by said second application, said first application starts download of the file specified by said first data.

7. A control method for a printing system including a printer and an information terminal for transmitting a print job toward the printer, executed by a computer of said information terminal, said computer including a memory, said control method comprising the steps of:

executing a first application for downloading a file; and executing a second application for transmitting the print job including the file downloaded by said first application toward an image formation device, the first application and the second application are separate applications which individually operate, wherein said second application is executed by being invoked by said first application, and is in a suspended state when said first application is executed, said first application is in a suspended state when said second application is executed, said first application accepts input of first data which is information specifying the file to be downloaded, stores the first data in said memory, invokes said second application, and shifts to the suspended state before starting download processing of the file specified by said first data and after invoking said second application, when said second application is invoked by said first application, said second application accepts input of second data which is information for print setting for the file specified by said first data, stores the second data in said memory, invokes said first application, and thereafter shifts to the suspended state, and when said first application is invoked by said second application, said first application starts download of the file specified by said first data.

8. A non-transitory computer-readable storage medium recording a program to be executed, in a printing system including a printer and an information terminal for transmitting a print job toward the printer, by a computer of said information terminal, wherein said computer includes a memory, said program causes said computer to execute a first application for downloading a file, said first application invokes a second application which is an application for transmitting the print job including the downloaded file toward an image formation device and which is in a suspended state when said first application is executed, the first application and the second application are separate applications which individually operate, said first application is in a suspended state when said second application is executed, and said first application accepts input of first data which is information specifying the file to be downloaded, stores the first data in said memory, invokes said second application, and shifts to the suspended state before starting download processing of the file specified by said first data and after invoking said second application, said suspended state continues at least until said second application accepts input of second data which is information for print setting for the file specified by said first data, stores the second data in said memory, and invokes said first application, and when said first application is invoked by said second application, said first application starts download of the file specified by said first data.

9. A non-transitory computer-readable storage medium recording a program to be executed, in a printing system including a printer and an information terminal for transmitting a print job toward the printer, by a computer of said information terminal, wherein said computer includes a memory, said program causes said computer to execute a second application for transmitting the print job including a file downloaded by a first application for downloading the file toward an image formation device, the first application and the second application are separate applications which individually operate, said second application is in a suspended state when said first application is executed, said first application being in a suspended state when said second application is executed, said second application is initiated by being invoked by said first application before start of download of the file specified by first data which is information specifying the file to be downloaded and is stored in said memory, and said second application accepts input of second data which is information for print setting for the file specified by said first data, stores the second data in said memory, invokes said first application to start the download of the file specified by said first data, and thereafter shifts to the suspended state.

* * * * *